United States Patent [19]

Keene

[11] 4,311,384
[45] Jan. 19, 1982

[54] LASER SCANNING SYSTEM

[75] Inventor: Wayne H. Keene, Medfield, Mass.

[73] Assignee: Raytheon Company, Lexington, Mass.

[21] Appl. No.: 601,764

[22] Filed: Aug. 4, 1975

[51] Int. Cl.³ .................... G01B 11/26; G02B 27/17
[52] U.S. Cl. ............................ 356/152; 250/236; 350/6.4; 356/5
[58] Field of Search .............. 250/236; 350/6.4; 356/4, 5, 141, 152, 158; 178/DIG. 20

[56] References Cited

U.S. PATENT DOCUMENTS

| | | | |
|---|---|---|---|
| 3,134,902 | 5/1964 | Chase et al. | 250/236 |
| 3,504,979 | 4/1970 | Stephany | 356/172 |
| 3,523,730 | 8/1970 | Hayek et al. | 356/4 |
| 3,527,533 | 9/1970 | Hook et al. | 356/5 |
| 3,573,463 | 4/1971 | Goodwin | 250/199 |
| 3,684,375 | 8/1972 | Granquist | 356/5 |
| 3,765,768 | 10/1973 | Budin et al. | 356/5 |
| 3,788,748 | 1/1974 | Knight et al. | 356/141 |
| 3,856,402 | 12/1974 | Low et al. | 356/5 |

Primary Examiner—S. C. Buczinski
Attorney, Agent, or Firm—Vincenzo D. Pitruzzella; Joseph D. Pannone; Milton D. Bartlett

[57] ABSTRACT

A scanning laser doppler system in which the change in angle between transmitted and received beams caused by the finite transit time to the target is automatically compensated. The scanning beam is produced as a downward looking Palmer scan pattern by an expanded laser beam transmitted through a rotating wedge. The rotating wedge is tilted in accordance with the invention to align the received beam with a portion of the transmitted beam upon a detector.

24 Claims, 10 Drawing Figures

LASER SCANNING SYSTEM

BACKGROUND OF THE INVENTION

1. Field of the Invention

The invention relates generally to a laser ranging and detecting system in which a coherent beam of light is transmitted, reflected from a target, received and processed to extract information concerning the target.

More particularly, the invention relates to a laser ranging and detection system in which the coherent beam of light is scanned through a predetermined pattern by a rotating wedge. The system may be of the doppler detection type in which the frequency of the received signal beam is compared with a portion of the transmitted signal beam to determine the velocity of targets.

2. Description of the Prior Art

In laser scanning systems of the present type, the received signal beams are processed by mixing them with a portion of the transmitted signal beam termed the local oscillator signal. Because of the finite transit time of the transmitted beam to the target and back, the received signal beams strike the rotating wedge at a different angle than that at which they were transmitted. This change in angle between transmitted and received beams causes the position of the received beam as it is focused upon the detector to vary. The position upon the detector varies with both the range to the target and the scanning rate. Because both of these parameters may be varied during a system scanning operation, fixed compensation cannot be used.

One prior solution was simply to slow down the rate of rotation of the scanning wedge to a speed such that the local oscillator signal and received signals were in sufficient alignment to produce a processable signal. Unfortunately, the maximum permissible scanning rate under such circumstances is too slow to be of use in most practical surveillance and reconnaissance applications.

SUMMARY OF THE INVENTION

Accordingly, it is an object of the present invention to provide a laser scanning system in which the local oscillator or reference beam and received signal beam are maintained in alignment over a wide range of target ranges and scanning rates.

It is also an object of the present invention to provide a laser scanning system with good beam alignment upon a detector as well as sufficiently high scan rates for practical applications in surveillance and reconnaissance.

These as well as other objects of the invention are met by providing a coherent electromagnetic scanning system having a signal return beam and a reference beam and means for aligning the signal return beam and the reference beam upon detecting means. The system may include rotating scanning means which produces a signal scanning beam. The aligning means operates upon the rotating scanning means. The aligning means positions the rotating scanning means preferably in response to the rate of rotation of the scanning means and/or the distance from the system to the target producing the signal return beam. The rotating scanning means may comprise a scanning wedge.

These as well as other objects of the invention are also met by providing a laser scanning system in which the beam is scanned through use of a rotating wedge wherein means is provided for tilting the rotating wedge at such an angle as to cause the received signal beam to be in alignment with the local oscillator beam upon detector means. Means is provided for tilting the rotating wedge and axes perpendicular to the center axis of the rotating wedge. In an airborne laser scanning system, the tilt is predetermined as a function of the altitude of the plane, the range or angle to the target, and rate of rotation of the rotating scanning wedge. Reflection from a surface of the rotating wedge produces the reference beam.

Primary and secondary curved mirrors provide the beam expansion function. The scan pattern is produced by a rotating scanning wedge which is rotated by a scan drive motor through a hollow bearing and associated coupling. Four tilt transducers positioned between the scanning wedge and hollow bearing assembly provide the tilt function. A scanning wedge tilt control circuit produces electrical signals to operate these transducers in accordance with the altitude of the system above the target, the range to the target, and the scanning rate of the scanning wedge.

Either pulsed or continuous laser operation may be used with the invention. Wavelengths in the infrared region of the spectrum are preferred.

In still another embodiment of the invention, the amount of tilt produced by the tilt transducers upon the scanning wedge is controlled by a feedback circuit. Means is provided for detecting the distance the received signal beam has strayed from the center of the detector. A correction is provided via the tilt transducers to align the received signal beam back towards the center of the detector.

DESCRIPTION OF THE PREFERRED EMBODIMENTS

Figure 1:
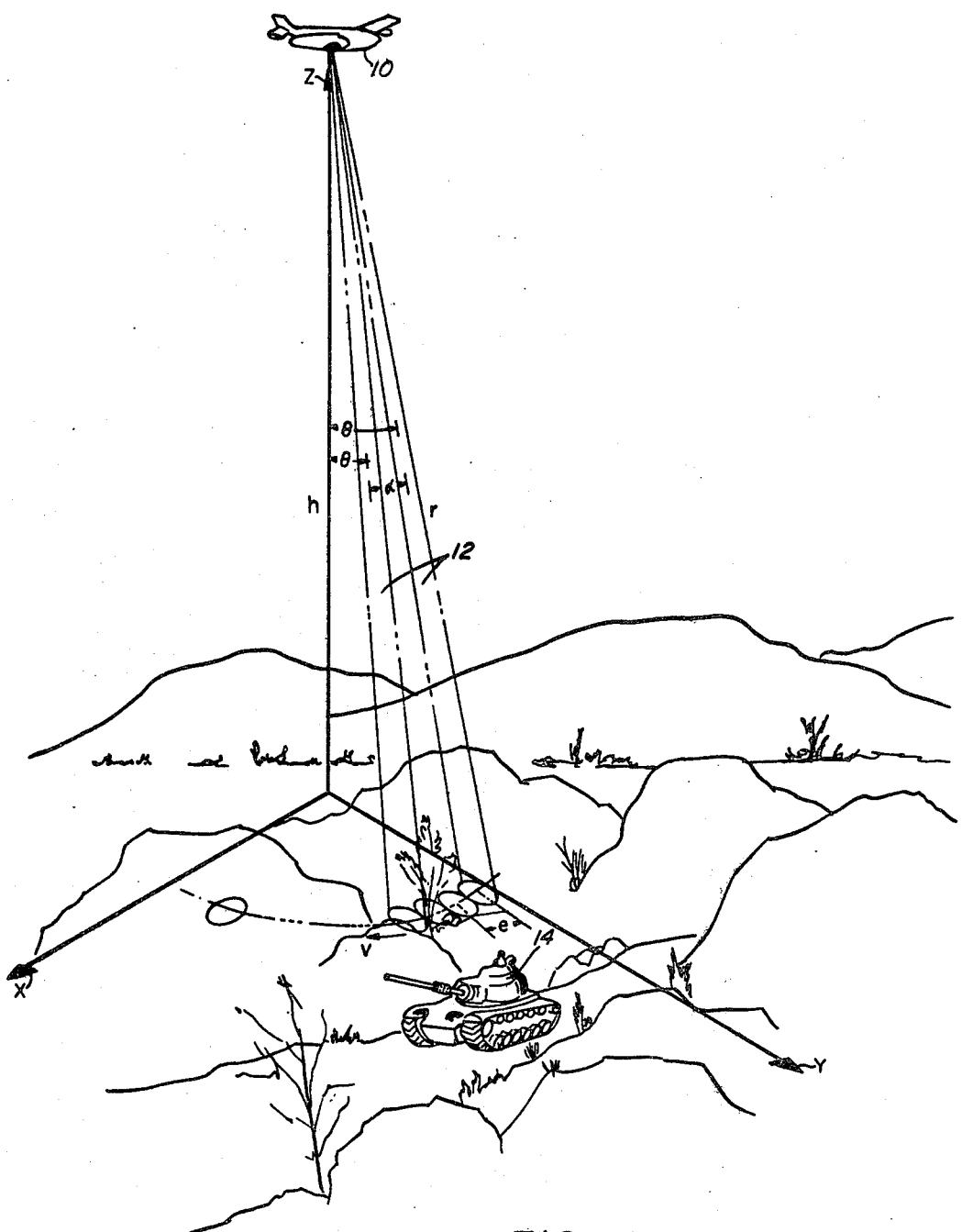
FIG. 1 is a perspective view of an airborne laser scanning system in accordance with the present invention and the scanning pattern produced thereby.

In FIG. 1 is shown a perspective view of a situation in which the present invention is used to advantage. Airplane 10 carries a laser scanning system constructed in accordance with the invention which is used to detect the presence of objects such as tank 14 upon the surface of the earth below the airplane. The laser scanning system, which operates through an aperture in the underside of airplane 10, scans the surface of the earth in a beam pattern 12 known in the art as a Palmer scan pattern. Portions of the laser signal beams are reflected back through the same aperture in the underside of airplane 10 where they are processed by receiver circuitry within the laser scanning system. Laser scanning systems in accordance with the present invention are found to be particularly useful in determining the type of target from which return signals are received because of its high resolution capabilities. Also because of the high resolution capabilities of such a system, this system is also useful in mapping the surface of the earth.

Figure 2:
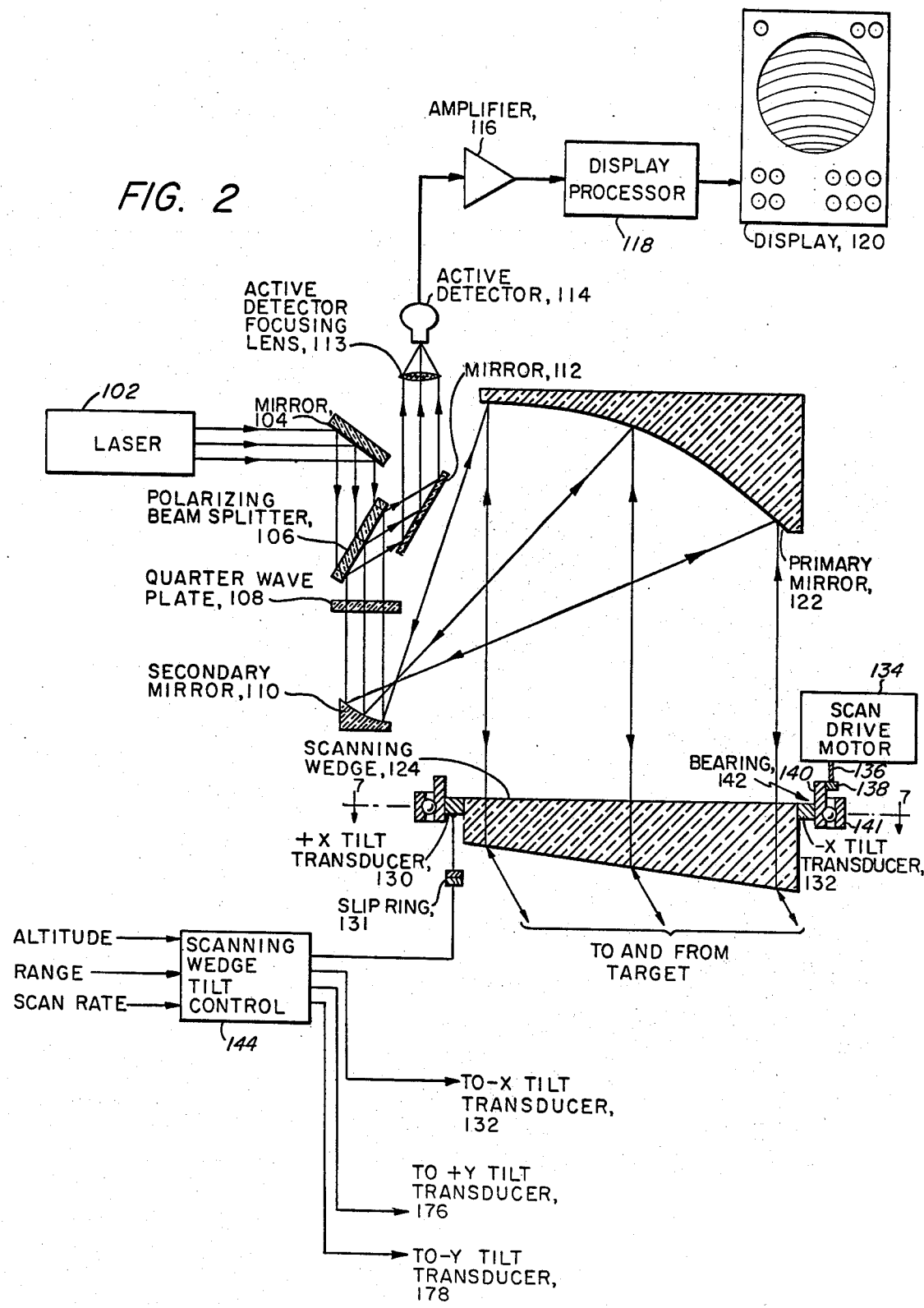
FIG. 2 is a block diagram of an embodiment of the invention using an active detector.

In FIG. 2 is shown a block diagram of a first embodiment of a laser scanning system in accordance with the invention. Laser 102 provides the laser light used to form the scanning beam for the system. A wide variety of wavelengths and power levels may be used depending upon the exact requirements of any particular application. By way of example, a carbon dioxide laser having a wavelength of 10.6 microns with a continuous power output of 5 watts has been used successfully. The output beam of laser 102 is reflected by mirror 104 to the upper surface of polarizing beam splitter 106. The major portion of the beam power passes through polarizing beam splitter 106 to quarter-wave plate 108, secondary mirror 110, primary mirror 122, and scanning wedge 124. A smaller portion of the beam is reflected from the upper surface of scanning wedge 124 back through the optical path where it is reflected from polarizing beam splitter 106 to mirror 112, active detector focusing lens 113 and active detector 114. This smaller portion of the laser beam is termed the local oscillator or reference signal beam.

The beam emerging from laser 102 and mirror 104 is linearly polarized. Light emerging from polarizing beam splitter 106 transmitted towards quarter-wave plate 108 is also linearly polarized. Quarter-wave plate 108 converts the linearly polarized beam from polarizing beam splitter 106 to circular polarization. The circularly polarized beam is then expanded in diameter by a beam expander comprising primary mirror 122 and secondary mirror 110. The surfaces of these mirrors are curved to a shape such that the emerging beam is parallel after being expanded in diameter.

Figure 7:
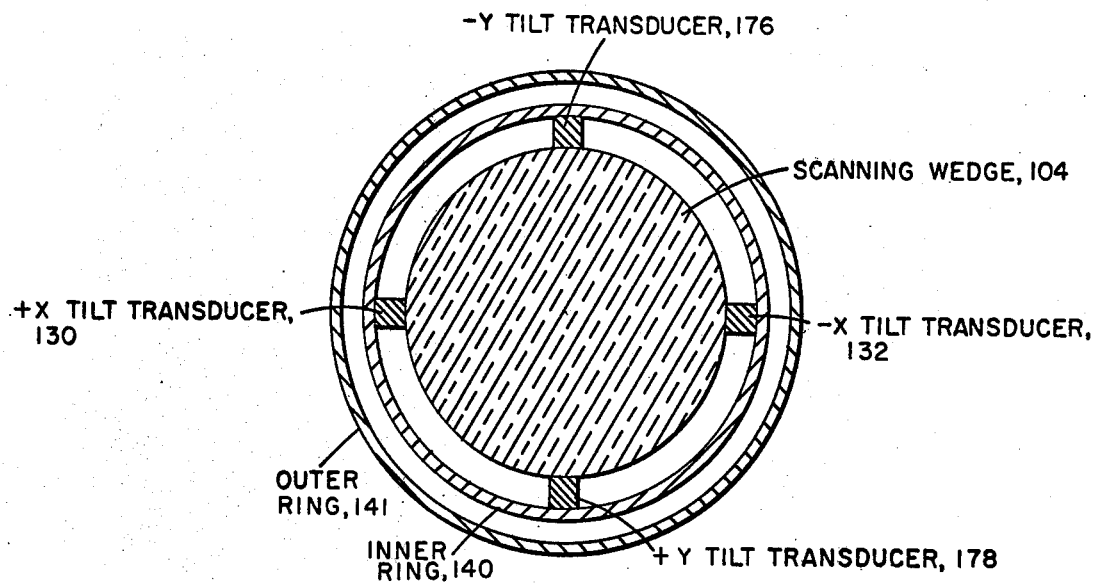
FIG. 7 is a sectional view of a first embodiment of the scanning wedge used with the invention.

The emerging expanded beam from primary mirror 122 is directed nearly perpendicular to the upper surface of scanning wedge 124. Scanning wedge 124, a cross sectional view of which is shown in FIG. 7, is generally cylindrical in shape with the upper surface nearly perpendicular to the axis of the cylinder and the lower surface inclined at an angle to the axis of the cylinder. A mounting frame having an inner ring 140 and outer ring 141 support scanning wedge 124. Scanning wedge 124 is coupled to inner ring 140 by four tilt transducers: +X tilt transducer 130, -X tilt transducer 132, +Y tilt transducer 178, and -Y tilt transducer 176. Outer ring 141 is directly coupled to the surrounding structure and remains stationary. Bearing 142, preferably a hollow type bearing, is fitted between inner ring 140 and outer ring 141. Inner ring 140, the tilt transducers, and scanning wedge 124 then are allowed to rotate when driven by scan drive motor 134 through coupling shaft 136 and drive gear 138. Rotation of scanning wedge 124 produces the Palmer scan pattern described in FIG. 1. All transducers are coupled to scanning wedge tilt control 144 through slip rings 131.

Signal return beams reflected from targets are received back at the lower surface of scanning wedge 124 and coupled therethrough back to primary mirror 122 and secondary mirror 110. The return signal beams are circularly polarized as were the transmitted signals. The polarization of the received signal beams is converted by quarter-wave plate 108 back to linear polarization. The received signal beams are nearly totally reflected from the lower surface of polarizing beam splitter 106 to mirror 112 and through detector focusing lens 113 to active detector 114.

Figure 9:
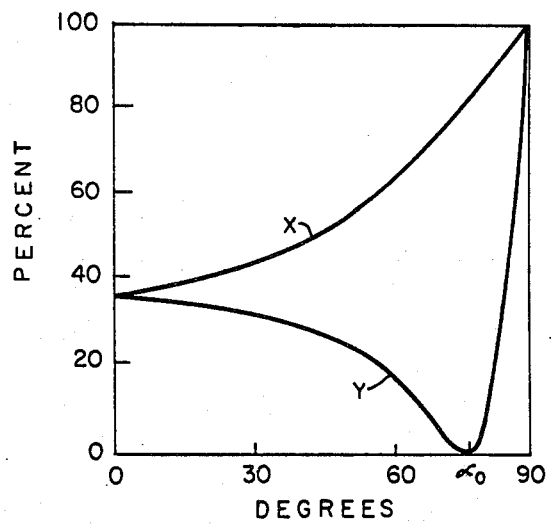
FIG. 9 is a graph of the percent of transmissivity versus degree of inclination of a polarizing beam splitter used with the invention.
Figure 10:
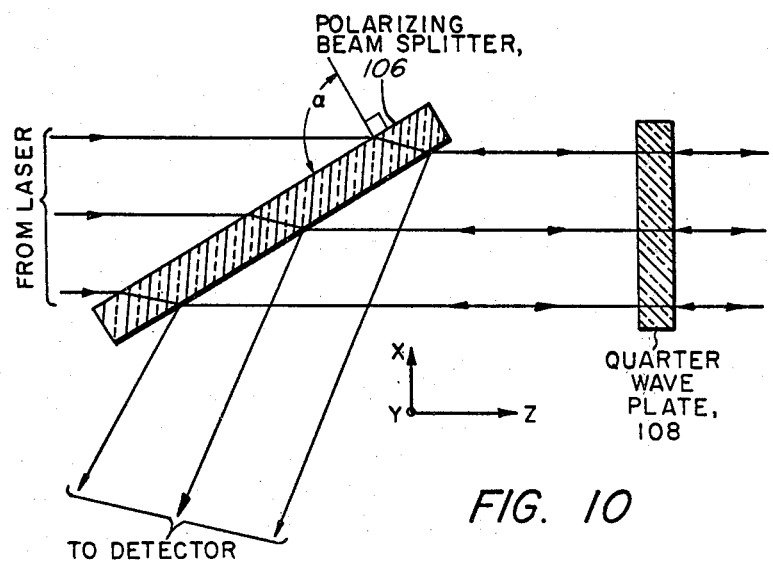
FIG. 10 is a cross sectional view of a polarizing beam splitter and quarter-wave plate as used with the invention.

Referring momentarily to FIG. 10 there is shown therein an expanded view of polarizing beam splitter 106 and quarter-wave plate 108. FIG. 9 is a graph showing the transmittance of polarizing beam splitter 106 as a function of the angle $\alpha$ as defined in FIG. 10, the upper curve of which relates to light having an electric vector in the X direction and the lower curve of which relates to light having an electric vector in the Y direction. Light emerging from the laser source has its electric vector in the Y direction so that it is essentially totally transmitted by polarizing beam splitter 106. Similarly, light incident in the other direction is reflected from the surface of polarizing beam splitter 106 with linear polarization in only the X direction. Further information concerning polarizing beam splitter 106 and quarter-wave plate 108 can be found in *Principles of Optics*, Max Born and Emil Wolf, Pergamon Press, London, (1970).

Because of the rotation of scanning wedge 124, the received signals strike the lower surface of scanning wedge 124 at a slightly different angle than the angle at which they were transmitted. Accordingly, this change in angle, were it not compensated, would cause a shift in the position of the focused received signal upon the surface of active detector 114. The movement in position of the received signal beam wuld cause misalignment between the received signal beam and the local oscillator signal beam thereby causing active detector 114 to produce inaccurate output signals.

To compensate for the misregistration of the received signal beam upon the surface of active detector 114, four tilt transducers are placed at right angles to one another between the outer surface of scanning wedge 124 and inner ring 140. Application of electrical signals to the pairs of tilt transducers causes scanning wedge 124 to be tilted or rotated in the specified axis. For example, application of a positive electrical signal to the +X tilt transducer 130 and a negative electrical signal to -X tilt transducer 132 causes scanning wedge 124 to be rotated clockwise in the plane of the paper as shown in FIG. 2. Reversal of the polarity of the signals to +X and -X tilt transducers 130 and 132 causes rotation in the counter clockwise direction. Similarly, application of signals to the +Y and -Y tilt transducers 176 and 178 causes tilting or rotation of scanning wedge 124 perpendicular to the rotation caused by +X and -X tilt transducers 130 and 132. The amount of rotation in either case is dependent upon the magnitude of the applied electrical signals.

The amount of tilting or rotation of the four tilt transducers 130, 132, 176, and 178 required to align the received signal beam with the local oscillator signal beam is dependent in airborne applications upon three parameters, the altitude above the ground, the range to the target or alternatively the elevation angle of the scanning beam, and the rate or frequency of rotation of scanning wedge 124. From these three parameters scanning wedge tilt control 144 computes the appropriate magnitude of electrical signals to be applied to the four tilt transducers to provide the proper amount of tilt for received signal beam alignment. Four signals are produced as an output from scanning wedge tilt control 144, one to each tilt transducer.

For an airborne system as shown in FIG. 1 and for an airplane flying along the Y axis as shown therein, the angular tilt to be applied to scanning wedge 124 along the Y axis is given by the formula:

$$\gamma = (2\pi h f \tan \theta / c)$$

where $\gamma$ = tilt angle of scanning wedge 124, h = altitude above ground level, f = rotation frequency of scanning wedge 124, $\theta$ = elevation angle of the scanning beam, and c = speed of light. The above formula assumes that the Y axis of the scanner system is in alignment with the Y axis of flight of the airplane.

The formula is developed as follows. Reference may be made again to FIG. 1 where the various parameters used in the development of the above formula are defined pictorially. Two contiguous "footprints" are shown separated by a distance e corresponding to the round-trip transit time $t_{RT}$ of the scanning beam. For a footprint ground velocity V, $e = Vt_{RT}$. The footprint ground velocity is in turn given by $V = (2\pi h \tan \theta / \tau)$ where $\tau = 1/f$ = the time period for one revolution of scanning wedge 124. Combining equations, $e = (2\pi h \tan \theta / \tau) t_{RT}$. The round trip transit time $t_{RT}$ is given by $t_{RT} = 2r/c$ where r is the distance from the airplane to the footprint. Hence, $e = (4\pi h r \tan \theta / c\tau)$. The angular separation between footprints is $\alpha = e/r$ and thus $\alpha = (4\pi h \tan \theta / c\tau)$. Finally, since reflection from a surface takes place at twice the angle of a normal input beam, $\gamma$ the angle through which scanning wedge 124 must be tilted is $\gamma = \alpha/2 = (2\pi h f \tan \theta / c)$.

Various schemes may be used for scanning wedge tilt control 144 for producing electrical signals for tilting scanning wedge 124 through the angle $\gamma$. Digital processing circuitry is preferred. h and f may be supplied as digital numbers. The value of tan $\theta$ may be computed using a look-up table of values or by using any of many well-known computation algorithms. The value of $2\pi/c$ may be pre-stored as a constant. A digital value of $\gamma$ may then be computed directly by multiplication. The digital value of $\gamma$ may then be converted to an analog voltage and appropriately scaled driving signals for the tilt transducers derived therefrom.

Output signals from detector 114 are amplified by amplifier 116 prior to being coupled to display processor 118. Display processor 118 converts the amplified detected signals to appropriate form for display by display apparatus 120. Preferably a semicircular display pattern is used corresponding to the Palmer scan pattern of the laser ranging and detection system. The velocity of targets may be indicated by a number of different methods including alphanumeric labeling.

Figure 3:
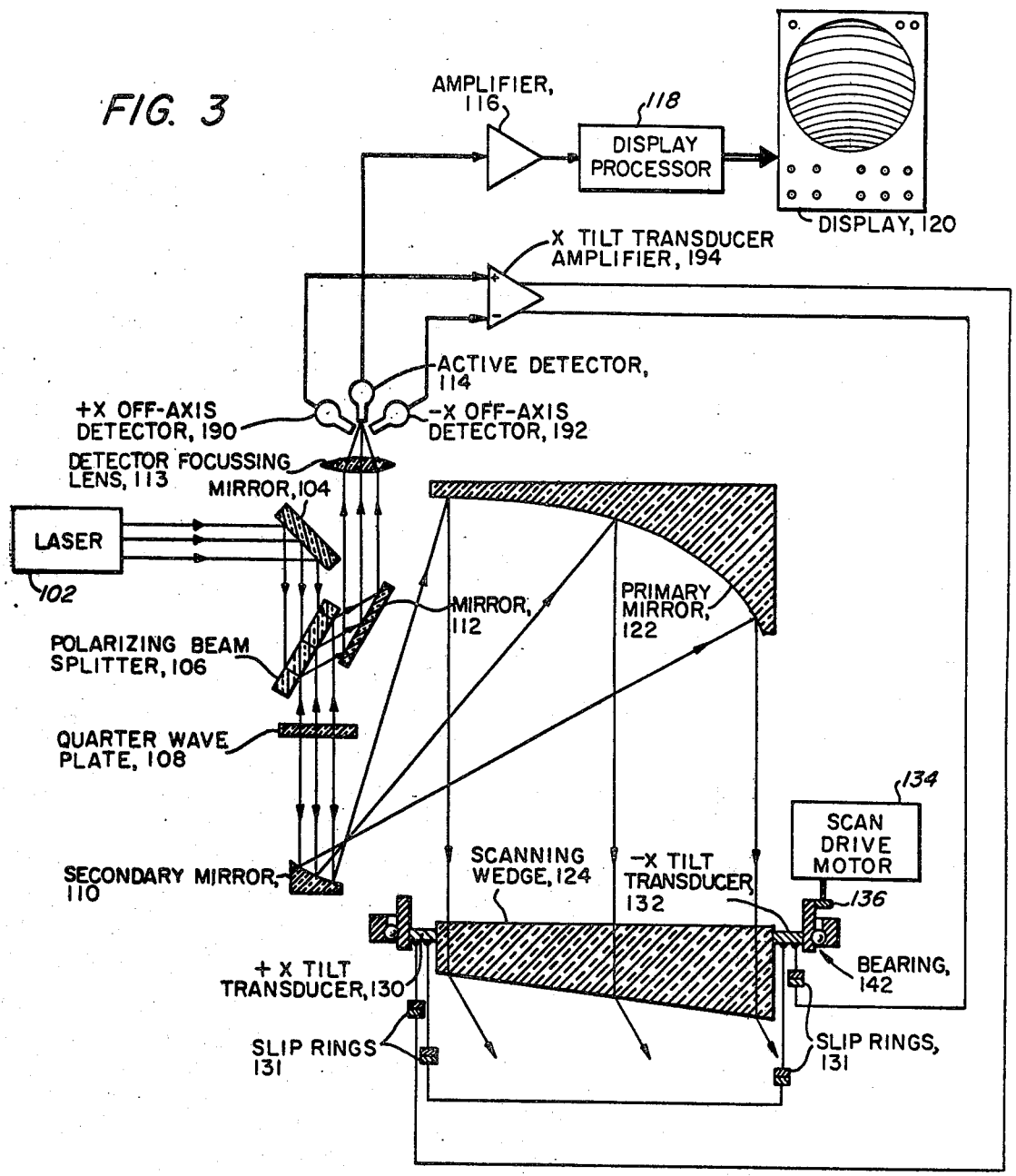
FIG. 3 is a block diagram of an embodiment of the invention using an active detector and feedback tilt control.

Referring now to FIG. 3 there is shown an alternate embodiment of the invention. In this embodiment of the invention, a feedback loop from the detector region to the tilt transducers is used to produce the appropriate tilt of scanning wedge 124. Four off-axes detectors are provided, one for each of the plus and minus directions of the X and Y axes, although only +X and −X off-axes detectors 190 and 192 are shown in FIG. 3 for clarity. +X off-axis detector 190 produces an output signal when the received signal beam strays from the center position of the detector in that direction. The magnitude of the signal from +X off-axis detector 190 is indicative of the distance from the center of the detector that the beam has fallen and is preferably in proportion to this distance. The −X off-axis detector 192 produces a similar signal when the received signal beam strays from the center of the detector 114 in the −X direction as do the +Y and −Y off-axis detectors. The signals from both +X off-axis detector 190 and −X off-axis detector 192 are coupled to X tilt transducer amplifier 194. The amplified output signals from X tilt transducer amplifier 194 are coupled back to +X and −X tilt transducers 130 and 132. Here the X tilt transducers are coupled in series. Otherwise a separate tilt transducer amplifier may be provided for each of the off-axis detectors coupled only to a single one of the tilt transducers.

Figure 4:
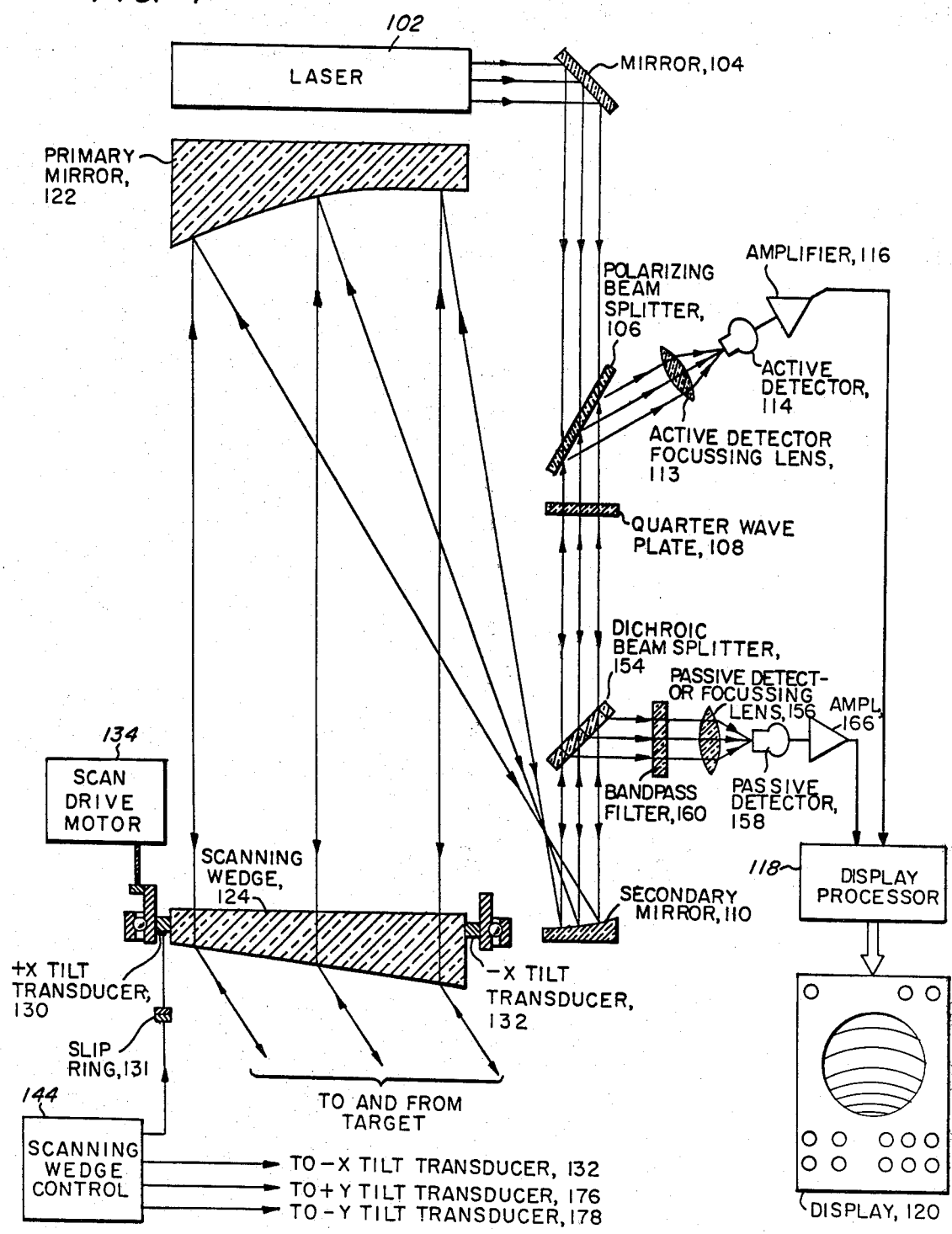
FIG. 4 is a block diagram of an embodiment of the invention using both active and passive detectors.

In FIG. 4 is shown a laser ranging system as in FIG. 2 with the addition of a passive detector device. Active detector 114 and its associated components function as in the embodiment of the invention shown in FIG. 3. As described above the active detector system is used primarily for detection of moving targets. The added passive detector is primarily useful for determining the type of target and providing a further means for identification of the classification of the target. For example, passive detector 158 may be used to measure the temperature of the target and its emissivity. The addition of such a passive detector is particularly useful in situations such as that shown in FIG. 1 where a target such as tank 14 may be expected to have a higher surface temperature than the surrounding regions. The addition of the passive detector capability is also important in situations such as when the tank is stationary and wherein no doppler shift could be produced for activation of the active detector.

Dichroic beam splitter 154 is transparent to a narrow band of wavelengths centered around the wavelength of light emitted by laser 102. Light of wavelengths other than those within the passband of dichroic beam splitter 154 are mostly reflected from its surface. The reflected components are directed towards passive detector 158 through band-pass filter 160 and passive detector focusing lens 156. Band-pass filter 160 passes light signals having a wavelength preferably between 3 and 5 $\mu$m. Passive detector focusing lens 156 then focuses the signals of the past wavelength onto the surface of passive detector 158. The output signals from passive detector 158 are amplified by amplifier 166 and coupled therefrom to display processor 150.

Display processor 118 and display apparatus 120 provide a presentation as previously described with the addition of information obtained from the output of the passive detector.

Figure 5:
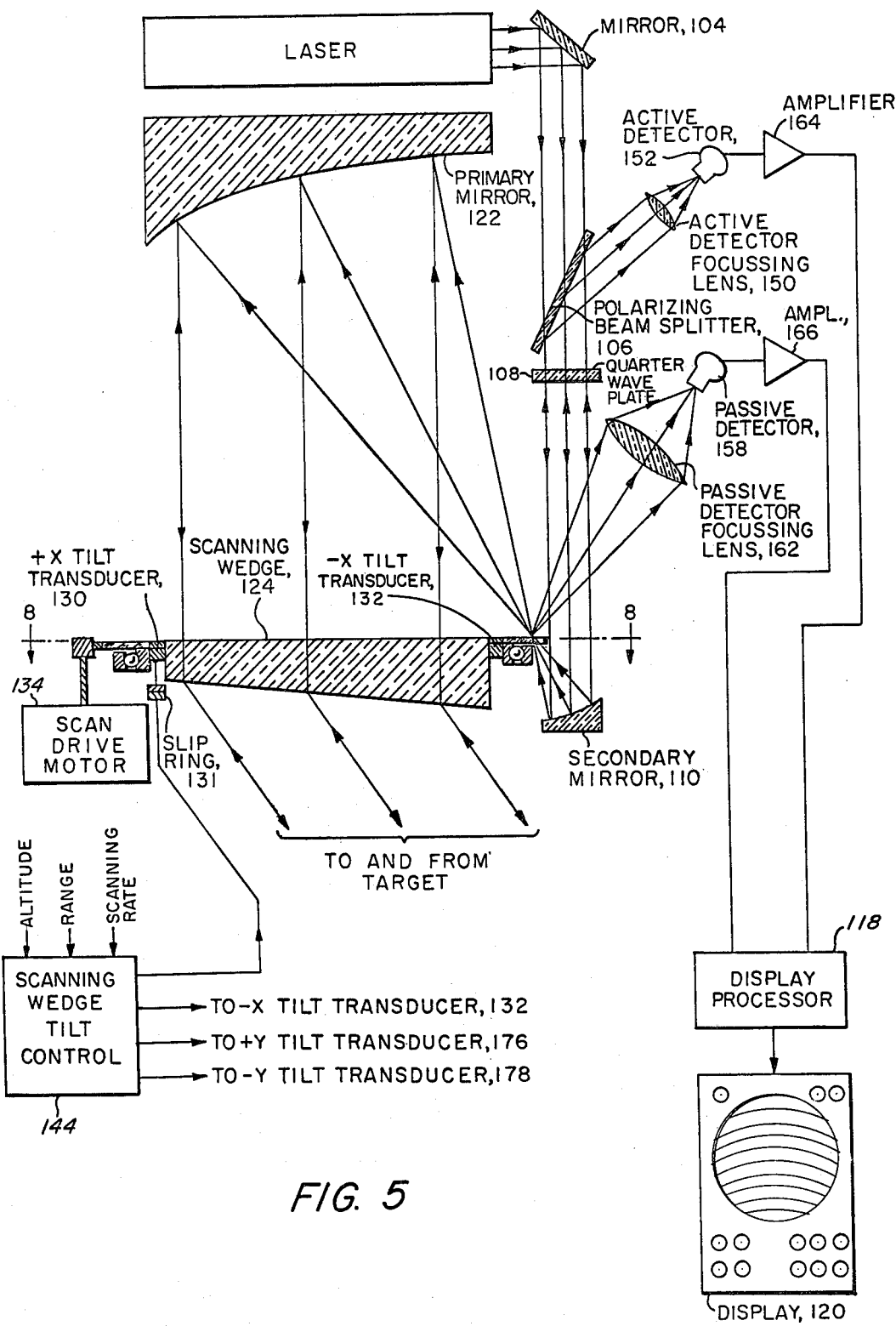
FIG. 5 is a block diagram of another embodiment of the invention using both active and passive detectors.
Figure 8:
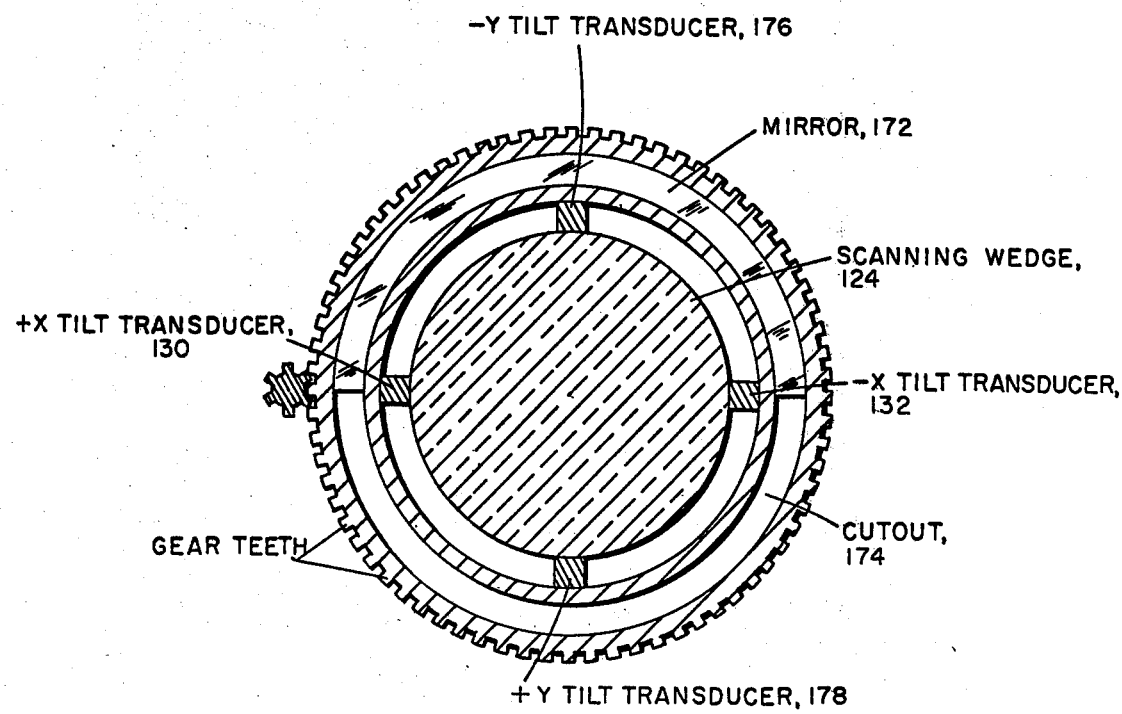
FIG. 8 is a cross sectional view of a second embodiment of a scanning wedge used with the invention.

Referring now to FIGS. 5 and 8 there is shown an embodiment of the invention employing passive detection in which beam splitting is accomplished using beam chopping. Referring first more particularly to FIG. 8, scanning wedge 124 is mounted within the center of a mounting frame such as chopper disc 168. A set of gear teeth 170 upon the outer edge of chopper disc 168 engages the drive shaft gear from scan motor 134 to produce rotation of scanning wedge 124. Scanning wedge 124 is coupled to chopper disc 168 through tilt transducers 130, 132, 176, and 178. The tilt function operates as described in the previous embodiments of the invention. The center portion of chopper disc 168 is divided into two sections. Mirrored surface 172 occupies one-half of the center portion upon the upper surface thereof. The other half of the center portion of chopper disc 168 is left open permitting light to pass therethrough. Primary mirror 122 and secondary mirror 110 are positioned such that the focal point of light passing therebetween falls within the center of cutout 174 in the same plane as that containing chopper disc 168.

When chopper disc 168 is rotated such that light is allowed to pass between primary mirror 122 and secondary mirror 110, the system operates as described in the embodiment of FIG. 2. No light is then coupled to passive detector 158. When the mirrored portion of chopper disc of 168 is positioned at the focal point of light passing between primary mirror 122 and secondary mirror 110 all of the light is reflected towards passive detector focusing lens 162. No light is then coupled through the remainder of the system. This embodiment of the invention has the advantage that no dichroic beam splitter is required and that there is very little interference between the laser light signal and the heat produced signal sensed by passive detector 158.

Figure 6:
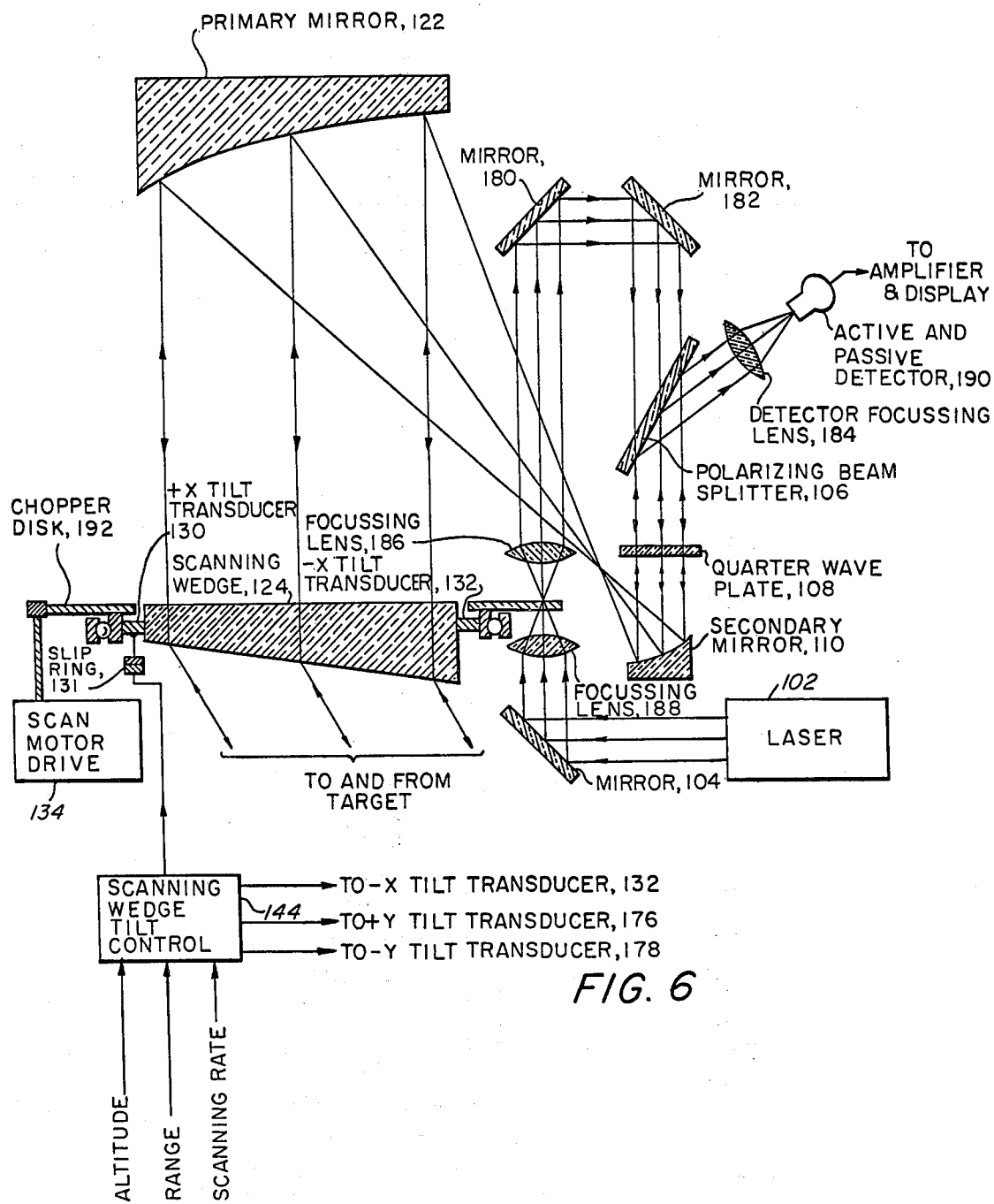
FIG. 6 is a block diagram showing an embodiment of the invention in which a single detector functions for both active and passive modes of operation.

In FIG. 6 is shown an embodiment of the invention in which a single detector means performs both active and passive detector functions. A chopper disc 192 as shown in FIG. 8 is used with this embodiment of the invention with the exception that no mirror is provided on the upper portion of the chopper disc. Two focusing lenses 186 and 188 are located upon either side of chopper disc 192. Focusing lenses 186 and 188 are positioned such that the focus of each of the lenses coincides with the center portion of chopper disc 192. Rotation of chopper disc 192 causes the light produced by laser 102 and reflected by mirror 104 to be alternately turned on and off. The pulsating light beam produced thereby is reflected from mirrors 180 and 182 through polarizing beam splitter 106, quarter-wave plate 108, secondary mirror 110, and primary mirror 122. In the active operation of the detector circuitry, incoming signals produced by reflections of the transmitted signal from targets are coupled from primary mirror 122 to secondary mirror 110, quarter-wave plate 108, polarizing beam splitter 106, and detector focusing lens 184 to active and passive detector 190. Active operation of the system occurs only during those times when the laser light is allowed to pass through chopper disc 192 and out through scanning wedge 124.

During the passive mode of operation of the system, chopper disc 192 blocks the laser output. Hence, signals reaching active and passive detector 190 consist only of the radiation emitted by the targets. No doppler effect for measuring the velocity of targets is then present because the blocking of the laser beam by chopper disc 192 also removes the presence of the reference beam which would otherwise be present.

This concludes the description of the preferred embodiments. Although preferred embodiments of the invention have been described, it is believed that numerous modifications and alterations thereto would be obvious to one skilled in the art without departing from the spirit and scope of the invention.

It is claimed that:

1. A laser scanning system comprising in combination:
   a source of coherent light;
   means for producing a scanning beam comprising a rotating wedge with said coherent light;
   detector means;
   means for producing a reference beam from a portion of said coherent light;
   means for receiving a signal return beam; and
   means for aligning said reference beam and said signal return beam upon said detector means comprising means for tilting said wedge along at least one horizontal axis therethrough.

2. The combination of claim 1 wherein said tilting means comprises at least one transducer means coupled to said wedge.

3. The combination of claim 2 wherein said tilting means operates in response to the rate of rotation of said wedge.

4. The combination of claim 3 wherein said tilting means further operates in response to the altitude above ground of said system.

5. The combination of claim 3 wherein said tilting means further operates in response to the distance of said system from a target producing said signal return beam.

6. The combination of claim 3 wherein said tilting means further operates in response to the angle between lines from said system vertical to the ground and from said system to a target producing said signal return beam.

7. The combination of claim 2 further comprising means for determining presence of misalignment between said reference beam and said signal return beam.

8. The combination of claim 7 wherein said alignment means operates in response to said means for determining the presence of misalignment.

9. The method comprising the steps of:
   producing a beam of coherent light;
   producing a scanning beam by coupling said beam of coherent light to a scanning wedge and rotating said scanning wedge;
   producing a reference beam from a portion of said beam of coherent light;
   receiving a signal return beam reflected from targets; and aligning said signal return beam with said reference beam upon detecting means by tilting said scanning wedge along at least one horizontal axis therethrough in response to the rate of rotation of said scanning wedge.

10. The method of claim 9 wherein said step of tilting further occurs in response to the altitude of said scanning wedge above the ground.

11. The method of claim 9 wherein said step of positioning further occurs in response to the distance of said scanning wedge from a target producing said signal return beam.

12. The method of claim 9 wherein said step of tilting further occurs in response to an angle formed between a line from said scanning wedge vertical to the ground and from said scanning wedge to a target producing said signal return beam.

13. A scanning laser doppler homodyne transceiver comprising in combination:
   a source beam of coherent light;
   detecting means;
   means for circularly polarizing said source beam;
   means for expanding said source beam;
   a rotating scanning wedge for producing a scanning pattern from the expanded beam, a local reference beam being produced as a reflection from a surface of said wedge and a signal return beam being transmitted through said wedge; and means for tilting said wedge along at least one horizontal axis therethrough substantially parallel to said surface, said tilting means aligning said reference beam with said signal return beam at said detector means.

14. The combination of claim 13 wherein said polarizing means comprises in combination:
polarizing beam splitting means; and
quarter-wave plate means.

15. The combination of claim 14 wherein said beam expanding means comprises a plurality of curved mirrors.

16. The combination of claim 15 wherein said curved mirrors have a concave reflecting surface.

17. The combination of claim 16 further comprising a rotatable mounting frame for said scanning wedge.

18. The combination of claim 17 wherein said tilting means comprises one or more position transducers coupling said wedge to said mounting frame.

19. The combination of claim 18 wherein said tilting means operates in response to the height of said transceiver above ground.

20. The combination of claim 19 wherein said tilting means further operates in response to the distance from said transceiver to a target producing said signal return beam.

21. The combination of claim 19 wherein said tilting further occurs in response to an angle formed between a line from said scanning wedge vertical to the ground and from said scanning wedge to a target producing said signal return beam.

22. The combination of claim 18 further comprising means for determining the presence of misalignment between said reference beam and said signal return beam, said tilting means operating in response to said misalignment determining means.

23. In combination:
a coherent electromagnetic radiation scanning system having a signal return beam and a reference beam and rotating scanning means comprising a scanning wedge; and
means for aligning said signal return beam and said reference beam with one another upon detecting means comprising means for tilting said scanning wedge along at least one horizontal axis therethrough in response to the rate of rotation of said wedge and the distance of said system from a target producing said signal return beam.

24. The method comprising the steps of:
producing a beam of coherent light;
coupling said beam of coherent light to a scanning wedge;
rotating said scanning wedge;
producing a reference beam from a portion of said beam of coherent light;
receiving a signal return beam reflected from targets;
producing signals representing the amount of misalignment of said signal return beam from said reference beam upon detecting means; and
tilting said scanning wedge along at least one horizontal axis therethrough in response to said signals to align said signal return beam with said reference beam upon said detector means.

* * * * *